Nov. 30, 1926.

H. W. MacDOUGALL 1,608,516

TESTING SYSTEM

Filed Nov. 19, 1924    5 Sheets-Sheet 1

Inventor:
Harry W. MacDougall
by  E.W. Adams  Atty

Nov. 30, 1926.

H. W. MacDOUGALL 1,608,516

TESTING SYSTEM

Filed Nov. 19. 1924

Inventor:
Harry W. MacDougall.
by E.W. Adams Att'y.

Nov. 30, 1926.

H. W. MacDOUGALL 1,608,516

TESTING SYSTEM

Filed Nov. 19, 1924 5 Sheets-Sheet 4

Fig. 4.

Inventor:
Harry W. MacDougall.
by E.W. Adams Att'y.

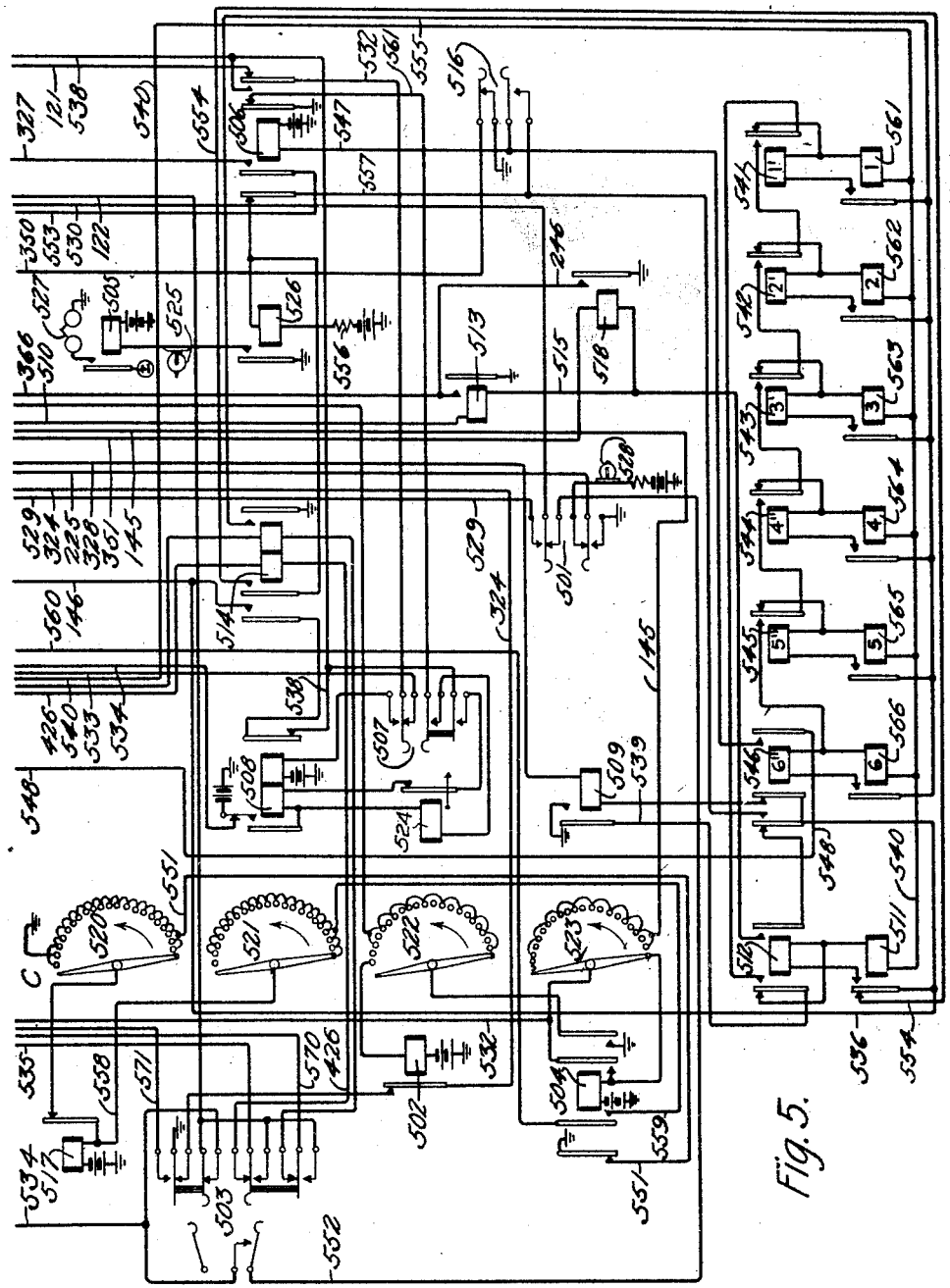

Patented Nov. 30, 1926.

1,608,516

UNITED STATES PATENT OFFICE.

HARRY W. MacDOUGALL, OF EAST ORANGE, NEW JERSEY, ASSIGNOR TO WESTERN ELECTRIC COMPANY, INCORPORATED, OF NEW YORK, N. Y., A CORPORATION OF NEW YORK.

TESTING SYSTEM.

Application filed November 19, 1924. Serial No. 750,752.

This invention relates to testing systems and more particularly to an arrangement for testing apparatus employed in a machine switching telephone system for producing impulses. This application is a continuation in part of my co-pending application Serial No. 599,204, filed November 6, 1922.

In machine switching telephone systems of the panel type such as disclosed in Patent No. 1,395,977, to F. A. Stearn et al., of November 1, 1921, and in Patent No. 1,501,871, to F. A. Stearn of July 15, 1924, impulse machines are employed for transmitting impulses used in setting the register relays in the sender circuit. For convenience of disclosure, the impulse machine described in the foregoing patents comprises a drum of insulating material in which a plurality of circumferential rows of contact segments are embedded, these segments being connected to a source of current through a common slip ring. A plurality of brushes engage the several rows of segments and are arranged to be variously connected to the contacts of the banks of translator switches through suitable distributing blocks for conducting impulses of current from the several contact segments to the bank terminals of the translator switches. In actual practice, however, the impulse machines employed consist of two groups of circular drums or commutators each drum having one or more metallic contact segments on its periphery. These drums are mounted adjacent to each other on a rotatable shaft, the shafts being continuously driven by any suitable source of power. Individual to each drum is a brush engaging the segments of its associated drum during its rotation.

Should the impulses transmitted by the pulse machine fail to be of the proper character, that is, if there is an open circuit when the circuit should be closed, or if the contact resistance of the segment and its associated brush is over a fixed maximum, above which the particular circuit will not function, a failure in the connection will occur.

An object of the invention is to guard against such failures by providing an arrangement for automatically testing the pulse machine under conditions similar to those found in actual use.

A feature of the invention is an arrangement whereby a plurality of drums are automatically tested in succession a predetermined number of times.

Another feature of the invention is an arrangement whereby two groups of drums are alternately tested automatically and the testing operation stopped after a predetermined number of tests has been made.

Another feature of the invention is an arrangement for repeatedly testing any desired one of these drums during a routine test.

Another feature of the invention is an arrangement whereby the continuity of a circuit through the testing device will be broken and progression arrested if two brushes become short circuited or the non-conducting portion of the drum surface becomes conducting by reason of a substance short-circuited with the conducting portion of said drum.

A further feature resides in the provision of two groups of relays responsive to impulses from the drums of the pulse machine under test, which are differently adjusted and are used alternately to check the circuits through the drums whereby different test conditions are imposed on the drums.

Another feature of the invention is an arrangement for stopping the test and actuating a visible and audible signal if a failure occurs.

Another feature of the invention is the provision of a key for restoring the apparatus to normal after a failure has caused the apparatus to stop off normal.

It is thought that the invention will best be understood from the following description, reference being had to the accompanying drawings which when taken together should be placed as shown in Fig. 6 to illustrate the invention.

Fig. 1 shows terminal banks of switches D and E and associated testing equipment for successively testing drums of pulse machine group A or B along with relays for associating the terminal banks and testing equipment of this figure and Fig. 3 with pulse machine group A.

Fig. 2 shows in developed form the A group of drums of a pulse machine under test, a sequence switch shown to the right of the dot and dash line for successively selecting drums of the A group, a portion of a master sequence switch shown at the left of the dot and dash line which functions with the other sequence switch of Fig. 2 and the sequence switch of Fig. 4 to select drums of either the A or B groups, and lamps for indicating the particular group of drums and the particular drum in the group which has been selected.

Fig. 4 shows in developed form the B group of drums of a pulse machine under test, a sequence switch shown to the right of the dot and dash line for successively selecting the drums of the B group, and the remaining cams of the master sequence switch shown in Fig. 2.

Fig. 5 shows a counting switch, counting relays and other control equipment for the testing device.

*Description of apparatus.*

Figure 3:
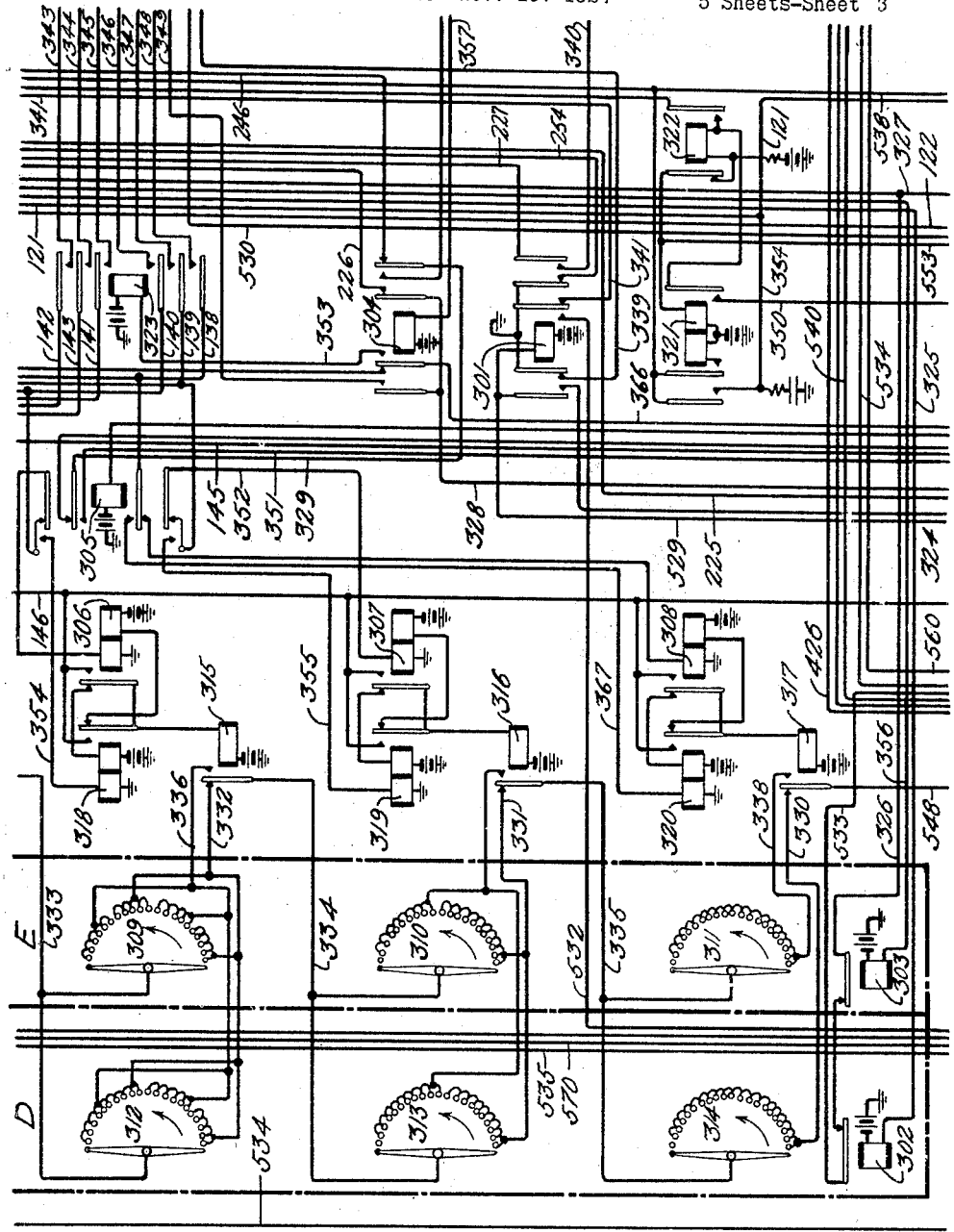
Fig. 3 shows terminal banks and control mechanism for switches D and E and associated testing equipment for successively testing drums of pulse machine group A or B along with relays for associating the terminal banks and testing equipment of this figure and Fig. 1 with pulse machine group B.

In Figs. 1 and 3 are shown two switches E and D used in conjunction with the register relays immediately to the right thereof for providing checking paths for each of the 40 drums. Each switch serves in the test of twenty drums of a pulse machine and therefore, two switches are required to test all of the drums. The D switch first traverses its terminals for testing the first twenty drums and rests on terminal 21 while the E switch passes over its terminals to test the next twenty. Relays 106, 107, 108, 306, 307, 308, 118, 119, 120, 318, 319 and 320 are register relays which operate in connection with the receiving drums of the pulse machine, and with the switches D and E. These relays are similar to the corresponding register relays of a standard sender with the exception that one set has a weaker adjustment and the other a stronger adjustment than the sender register relays. The above mentioned switches, and the counting switch C of Fig. 5, are of the well known step-by-step type wherein the brushes being adapted to be moved upon the deenergization of their respective stepping magnets 617, 302 and 303.

Figure 2:
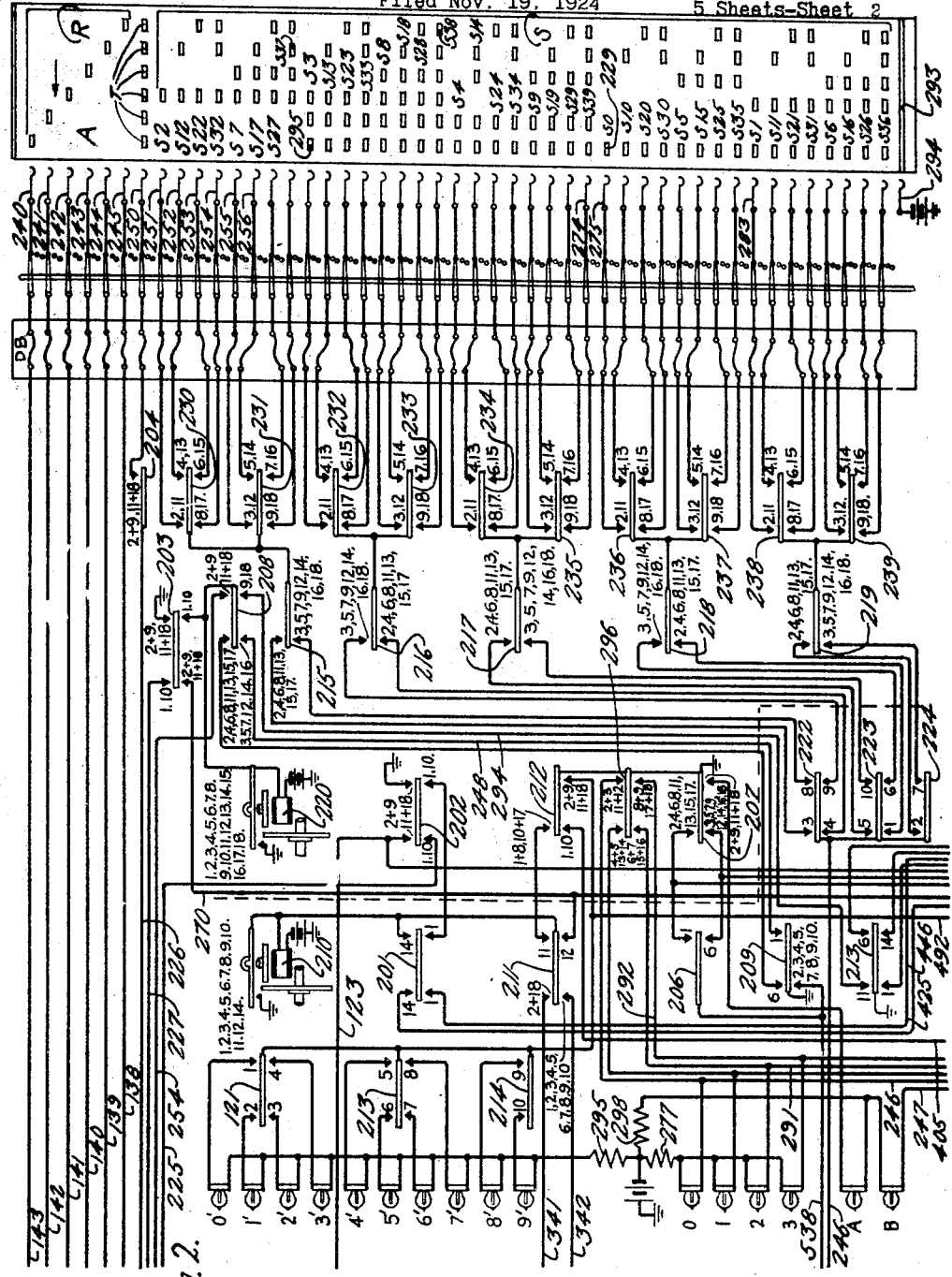

Sequence switches 210, 220 and 410 which are shown in Figs. 2 and 4 are similar to the one described in detail in the patent to Reynolds and Baldwin No. 1,127,808 of February 9, 1915.

To the left of the dotted line Fig. 2 and Fig. 4 is shown sequence switch 210. This switch moves one position for each sending drum tested and when five tests have been made moves sequence switch 220 or 410, depending upon which group of drums is being tested, one position to connect the next group of five drums. When ten drums S—1 to S—10 have been tested, sequence switch 210 restores to normal, in which position ten other drums S—11 to S—20 are tested. Sequence switch 210 makes four revolutions to test the 40 drums. In position 2 to 11 of sequence switch 220 drums S—0, S—1, S—2, S—3 and S—4 are connected through positions 1, 2, 3, 4, and 5 respectively of sequence switch 210. From position 3 or 12 of sequence switch 220, switch drums S—5, S—6, S—7, S—8, and S—9 are connected through positions 6, 7, 8, 9 and 10 of sequence switch 210 and so on. Sequence switch 220 moves one position for each five drums tested. Fig. 4 shows the B group of drums which is similar in all respects to the A group of Fig. 2. Sequence switch 410 shown in Fig. 4, is used in the same manner as sequence switch 220 for testing the B group. The impulse machine which is shown in its developed form in the right hand portion of Figs. 2 and 4 comprises two groups of drums designated A and B respectively, comprising a group of sending drums S, a group of receiving drums R and a timing drum T. The section included by the parentheses R and R′ are the receiving drums, the segments T and T′ are the timing drums and the remaining drums included within the parentheses S and S′ are the sending drums. Battery is continuously connected through brushes 294 and 494 to rings 293 and 493. The drums are assumed to rotate in the direction indicated by the arrow.

The block DB shown on both Figs. 2 and 4 is a cross connection block for cross connecting the brushes of the impulse machine to the cams of sequence switches 220 and 410 and to bank contacts of sender translator switches. Fig. 2 also shows three series of lamps for indicating to the test man the particular group and the number of the sending drum being tested. Lamps A and B are alternately lighted to indicate the group of drums being tested. Progress lamps 0 to 3 indicate the tens digit of the drum number being tested and lamps 0′ to 9′ indicate the unit digit of the drum number being tested. If sending drum S—21 of group A is being tested circuits are closed for lighting lamp A, tens lamp 2 and units lamp 1. The counting switch C shown on Fig. 5 is controlled by magnet 517 and is used to count the cycles of the test. This switch takes one step for each complete test of the groups of drums A and B. When 20 complete tests have been made which is indicated by the switch stopping on terminal 22 the relay 502 is operated stopping the test and restoring all apparatus to normal.

Fig. 5 also shows a return to normal key 503 which restores all equipment to normal at any time during the test. A repeat key 507 is also shown in Fig. 5. This key is operated to advance the circuit to a particular drum on which a series of tests are to be made. In case of failure of a drum and it is desired to repeat the test, key 507 is operated in conjunction with key 516 which is the control advance key. This key is used for advancing the test circuit from a blocked position in order to start the next test. Key 501 is a start key which is used for starting the test circuit on its cycle of tests.

The gang switches G and G' shown on Figs. 2 and 4 are employed to connect any one of a plurality of pulse machines into service or into association with the testing device. As disclosed the pulse machine illustrated is connected over the upper contacts of the gang switches to the testing device.

In order to more easily understand the operation of the test circuit, it will be assumed that the test circuit takes the place of a sender, in which case the pulses from the sending drums prepare circuits which extend through a combination of relays similar to the register relays of the sender and thence through to the receiving drums. Certain of these register relays are operated according to the denomination of the pulses sent. Should any or all of these relays fail to operate either by reason of a short or open circuit or ground, a circuit will not be completed through to the receiving drums. Should this be the case, a circuit is not completed for advancing the testing device to its next test position. When this occurs, a circuit is closed for lighting a lamp and operating a bell as a signal to the test man or operator that there is a failure upon said drum. Upon the above mentioned failure, the test man, by noting the number of the drum indicated by the lamps, may effect a repair and thus continue the test. If it is desired to repeat the test of this particular drum, a key is operated, causing the test circuit to repeat the test of the repaired drum so long as the operation of the key is continued. If, on the other hand, it is desired to return the circuit to normal after a failure, another key is operated whereupon a new set of tests is initiated.

*Description of operation.*

*Testing drums of the A group.*—To start the test the test man operates key 501 which closes a circuit for operating relay 301 from battery, through its winding, conductor 529, upper make contact of key 501, conductor 530 to left hand contacts of sequence switch spring 401, conductor 425, lower contacts of sequence switch springs 201 and 202, conductor 225 to ground on the lower make contact of key 501. Relay 301 locks from battery, through its winding and outer left front contact, conductor 324, back contact of relay 502 to ground on the upper normal contact of key 503. The operation of relay 301 operates relay 504 from battery, through its winding, terminal 1 and brush of arc 523, conductor 532 to the inner right front contact of relay 301 to ground. Relay 301 now causes sequence switch magnet 220 to operate and move the switch from position 1 or 10 to position 2 or 11 depending upon which position it is standing in, by closing a circuit from battery, through magnet 220, lower right and upper left contacts of spring 203, conductor 227, right outer front contact of relay 301, conductor 340, lower contacts of sequence switch springs 402 and 403 to ground. In position 2 a circuit is closed for lighting lamp A from battery through resistance 298, lamp A to ground on the lower right contact of sequence switch cam 207, indicating that the A group of drums is being tested. Switch D now moves off normal to position 1, magnet 302 being energized over a circuit from battery, through its winding, conductor 325, back contact of relay 101, conductor 121, right outer back contact of relay 506, conductor 532, upper back contact of key 507, conductor 533, back contacts of magnets 302 and 303, conductors 326, and 327, right back contact of relay 102, outermost right back contact of relay 103, conductor 122, innermost upper back contact of key 503, conductor 534, terminal 22 and brush of arc 112, conductor 123 to ground on the upper contacts of sequence switch spring 202. Relay 514 now operates over a circuit from battery, on the left back contact of relay 508, conductor 534, upper contact of sequence switch spring 404, conductor 426, through the left winding of relay 514 to the uppermost lower back contact of key 503, conductor 535 to terminal 1 and brush of arc 112, conductor 123 to ground on the upper contacts of sequence switch spring 202. The stepping relay 509 now operates and releases on battery pulses from pulsing segments T of the A group of drums over a circuit from battery, brush 294, segment 293 and T segments on drum A, brush 250, contact of sequence switch spring 204, conductor 226, innermost right back contact of relay 304, conductor 328, through the winding of relay 509, innermost left back contact of relay 546, conductors 536, and 537, outermost left back contact of relay 514, right back contact of relay 508, conductor 538, upper contact of sequence switch spring 206 to ground on the upper contact of sequence switch spring 207.

The operation of relay 509 operates the relay 511 over a circuit from ground at the contact of relay 509, conductor 539, right back contact of relay 512, through the winding of relay 511, conductor 540, lower contact of sequence switch spring 424, conductor 534, to battery on the left back contact of relay 508. When relay 509 releases between the first and second pulses a relay operates in series with relay 511 in a circuit from battery at the left back contact of relay 508, conductor 534, lower contact of sequence switch spring 424, conductor 540, through the winding of relays 511 and 512, front contact of relay 511, conductor 536, conductor 537, outer left front contact of relay 514, right back contact of relay 508, conductor 538, upper right contact of sequence switch spring 206, to ground through the upper left contact of sequence switch spring 207.

Relay 513 now operates from battery on the different sending drums through contacts of springs 222, 223 and 224, over conductor 246, outermost right back contact of relay 304, conductor 329, innermost upper contact of relay 305, conductor 510, through the winding of relay 513, right front contact of relay 512, outermost left back contact of relay 546, conductor 536, left front contact of relay 514, right back contact of relay 508, conductor 538 to ground on sequence switch spring 209. Battery on the S—0 contact of drum A, operates relay 513 over a circuit from contact 229, brush 275, upper left contact of sequence switch spring 236, lower contact of spring 218, lower left contact of sequence switch spring 223, conductor 246, outermost right back contact of relay 304, conductor 329, innermost upper back contact of relay 305, conductor 510, through the winding of relay 513, conductor 515, right front contact of relay 512, outer left back contact of relay 546, conductor 536, conductor 537, outermost left front contact of relay 514, right back contact of relay 508, conductor 538, upper contact of sequence switch spring 206, to ground through the upper contact of sequence switch spring 207. At this time a circuit is closed from battery through units lamp 0′ upper right contact of sequence switch spring 121, lower right contact of sequence switch spring 212 to ground lighting lamp 0′. A circuit is also established to light the tens lamp 0 from battery through resistance 277, filament of tens lamp 0, to ground through the right upper contact of spring 296. As hereinbefore described lamp A is lighted at this time to indicate a test of the A group drums. This with lamp 0 and 0′ indicated to the test man that the S—0 segment of drum A is being tested. The succeeding operations of relay 509 operate the counting relays 561 to 566, inclusive, according to the number of pulses sent out by the pulse machine, in conjunction with counting relays 541 to 546, inclusive. Since the pulse machine is designed to transmit six impulses per revolution these relays will all be operated during a single revolution of the pulse machine and thus upon the operation of relay 546 a complete revolution will be measured.

Simultaneously, relay 513 is subjected to pulses from the segments of the sending drums under test, causing relay 513 to operate for each segment encountered. Since the drum S—0 under test at this time has but one segment, the operation of relay 513 operates relay 105 once during a revolution of the pulse machine in a circuit from battery through its winding, conductor 124, innermost left back contact of relay 304, conductor 366 to ground on the contact of relay 513. The operation of relay 105 connects the six conductors, 138 to 143, inclusive, which are connected to the receiving brushes 240 to 245, inclusive through the register relays 106, 107, 108, 306, 307 and 308. These register relays receive but one battery impulse each during a single revolution of the pulse machine from the R segments of drum A. Thus since relay 105 is energized at the instant the brush 240 engages the first receiving drum segment, this segment being in axial alignment with the segment 229 of the S—0 sending drum, a circuit is completed for operating register relay 106, extending from battery on the receiving drum segment, brush 240, conductor 143, uppermost contact of relay 105, upper normal contact of relay 104, left winding of relay 106 to ground. Relay 106 operates locking over its right winding and back contact of relay 118 and its own front contact in parallel with relay 115 over conductor 146 to ground as previously traced at spring 207. As soon as the pulse machine rotates to disengage brushes 240 and 275 relays 513 and 105 deenergize. When the brushes 241 to 245 engage their respective R segments during the continued rotation of the pulse machine, since there are no corresponding sending segments on the drum S—0 and relay 105 does not energize, circuits for the remaining register relays 107, 108, 306, 307 and 308 are not effective. When the pulse machine completes a revolution and relay 546 energizes, the circuit previously traced through relay 513 is rendered ineffective.

*Checking the registration.*—Relay 546, upon operation, closes a checking path when relays 106, 107, 108, 306, 307 and 308 are correctly operated for advancing the test circuit to the next drum. Relay 506 operates in this checking path from battery through its winding, conductor 547, right front contact of relay 546, conductor 548, left back contact of relay 317, conductor 330, terminal 1 and brush of arc 314, conductor 335, back contact of relay 316, conductor 331, terminal 1 and brush of arc 313, conductor 334, back contact of relay 315, conductor 332, terminal 1 and brush of arc 312, conductor 333, back contact of relay 117, conductor 130, terminal 1 and brush of arc 114, conductor 134, back contact of relay 116, conductor 131, terminal 1 and brush of arc 113, conductor 133, front contact of relay 115, conductor 135, terminal 1 and brush of arc 112, conductor 123 to ground through the upper left contact of cam 202. Relay 506, upon operating, starts the operations necessary to advance the circuit for testing the next drum.

The operation of relay 506 closes a circuit for operating relay 321 from battery through its winding, conductor 553, innermost left front contact of relay 506, conductor 327, conductor 326, normal contacts of magnets 302 and 303, conductor 533, upper normal contact of key 507, conductor 532, outermost right front contact of relay 506, conductor 538, upper right contact of sequence switch spring 206 to ground on the upper left contact of sequence switch spring 207. Relay 321 closes a circuit through the winding of relay 322, right contact of relay 321, conductor 350 to ground at key 516. This ground on sequence switch spring 207, however, shunts relay 322, until magnet 302 breaks its contact. Magnet 302 is now energized in a circuit from battery through its winding, conductor 325, right back contact of relay 101, conductor 121, conductor 354, outermost left front contact of relay 321, conductor 355, conductor 538 to ground through the upper left contact of sequence switch spring 207. This operation of magnet 302 removes the shunt from around relay 322, allowing it to operate from battery through its winding, right front contact of relay 321, conductor 350 to ground on the uppermost contact of key 516. Relay 321 now locks through its innermost left front contact to ground over conductor 538 as previously traced. Magnet 302 remains operated until sequence switch 210 moves into position 2. The operation of relay 322 advances sequence switch 210 from position 1 to position 2 over a circuit from battery through sequence switch magnet 210, lower left contact of sequence switch spring 211, conductor 342, right front contacts of relays 322 and 321, conductor 350 to ground on the upper contact of key 516. When sequence switch 210 advances from position 1 to position 2, the relays 106, 115, 511, 512, 541 to 546, 561 to 566, 506, 321, 322 and 514 release. Relay 321 in releasing removes ground from the operating circuit of magnet 302 thereby advancing the brushes of switch D to position 2. Sequence switch 220 remains in position 2, thereby closing circuits for the test of sending drum S—1.

With switch D in position 2 relay 514 operates over the same circuit as traced above. The counting relays operate as the pulse machine rotates, and relays 513 and 105 operate when the brush 283 engages segments of drum S—1, thus closing the circuits for relays 106 and 108. The operation of relay 106 closes a circuit for the operation of relay 115 from battery through its winding, left front contact of relay 106, conductor 146, outermost left front contact of relay 514, right back contact of relay 508, conductor 538 to ground on the lower left contact of sequence switch spring 209. The operation of relay 108 closes a similar circuit for the operation of relay 117. Relay 108 operates in a circuit from ground through its left winding, conductor 147, uppermost lower back contact of relay 104, innermost upper front contact of relay 105, conductor 141, brush 242 to battery on the third segment of section R of drum A. After relays 541 to 546 and 561 to 566 have been operated as hereinbefore described, the checking circuit will be closed for operating relay 506 in a circuit from battery through its winding, conductor 547, right front contact of relay 546, conductor 548, back contact of relay 317, conductor 330, terminal 2 and brush of arc 314, conductor 335, back contact of relay 316, conductor 331, terminal 2 and brush of arc 313, conductor 334, back contact of relay 315, conductor 332, terminal 2 and brush of arc 312, conductor 333, front contact of relay 117, conductor 137 terminal 2 and brush of arc 114, conductor 134, back contact of relay 116, conductor 131 terminal 2 and brush of arc 113, conductor 133, front contact of relay 115, conductor 135, terminal 2 and brush of arc 112, conductor 123 to ground through the upper contacts of sequence switch spring 202. Sending segments S—2, S—3 and S—4 are tested in a similar manner having their particular checking path closed through front contacts of relay 117, of relays 115, 116, and 117, and relays 115 and 116 respectively. Sequence switch 210 advances one position for each drum tested until position 6 is encountered at which time segments S—5 to S—9 are tested.

With sequence switch 220 in position 2 it is only possible to test segments S—0 to S—4. Therefore, it will be necessary to advance the switch into position 3 for testing segments S—5 to S—9. Sequence switch 220 is advanced to position 3 in a circuit from battery through sequence switch magnet 220, upper left contact of sequence switch spring 208, conductor 254 to ground on the upper left contact of sequence switch spring 209. The test circuit, during this period, is prevented from making a test by opening the ground on sequence switch spring 207. When position 3 is reached, segments S—5 to S—9 inclusive, are tested in a similar manner to segments S—0 to S—4. After segment S—9 has been tested, sequence switch 210 is moved to position 11 by the checking path as hereinbefore described. As position 11 is a pass by position, the sequence switch is moved to position 12 over a circuit from ground through the upper contact of sequence switch spring 212, upper right contact of sequence switch spring 211, to battery through sequence switch magnet 210. Position 12 is also a pass by position and the switch is moved to position 13 over a circuit from ground through the upper right and lower left contacts of sequence switch spring 203, conductor 294, lower right contact of sequence switch spring 211 to battery through the winding of sequence switch magnet 210. Sequence switch 210 is moved to position 14 by ground on its master contact. Sequence switch 210 is now moved into position 15 over a circuit from ground through the upper left contact of sequence switch spring 412, conductor 446, upper contacts of sequence switch spring 201 to battery through the winding of sequence switch magnet 210. The sequence switch is now advanced through positions 16, 17 and 18 and into normal position 1 by its master contact. When sequence switch 210 reaches position 1, sequence switch 220 moves from position 3 to position 4 over a circuit from ground through the upper right contact of sequence switch spring 209, conductor 248, lower left contact of sequence switch spring 208 to battery through the winding of sequence switch magnet 220. The testing circuit is now in position for testing segments S—10 to S—14. With sequence switch 220 in position 4 and sequence switch 210 advanced progressively through positions 1 to 5, drums S—10 to S—14 are successively tested. Sequence switch 220 then advances to position 5 and as sequence switch 210 advances through positions 6 to 10, drums S—15 to S—19, inclusive, are tested in a similar manner to that for testing drums S—0 to S—9, hereinbefore described. At the termination of the test of drum S—19, sequence switch 210 advances to position 11 over the circuit described above and allows the switch D to step to terminal 21 where it remains during the test of drums S—20 to S—39, inclusive.

At this time, relay 101 operates in a circuit from battery through its right winding, innermost right back contact of relay 103, conductor 155 terminal 21 and brush of arc 112, conductor 123 to ground through the upper contacts of sequence switch spring 202. The operation of the relay 101 closes a circuit for starting the switch E. This circuit may be traced from battery through magnet 303, conductor 356, right front contact of relay 101, conductor 121, outermost right back contact of relay 506, conductor 532, upper normal contact of key 507, conductor 533, interrupter contacts of magnets 302 and 303, conductor 326, conductor 327, right back contact of relay 102, conductor 156, normal terminal and brush of arc 109, conductor 152, conductor 159, outermost left front contact of relay 101, conductor 123 to ground at the upper contacts of sequence switch spring 202. This circuit moves the switch E from its normal position to position 1 in which position segment S—20 may be checked.

Sequence switches 210 and 220 now advance for testing segments S—20 to S—29 in the same manner as described for testing segments S—0 to S—9. When sequence switch 210 leaves position 10 after two complete revolutions, the E switch is now on terminal 21. At this time relay 102 is operated over a circuit from battery through its winding, conductor 158, terminal 21 and brush of arc 109, conductor 152, conductor 159, outermost left front contact of relay 101, conductor 123 to ground at the upper contacts of sequence switch spring 202. Relay 101 now locks to ground in parallel with relay 102 through its left winding and innermost left front contact conductor 160, conductor 158, terminal 21 and brush of arc 109, conductor 152 to ground on the innermost left front contact of relay 102. Relay 103 now operates in a circuit from ground on the outermost left front contact of relay 102 and locks through its right winding and innermost right front contact, conductor 155, terminal 21 and brush of arc 112, conductor 123 to ground through the upper contacts of sequence switch spring 202. The brushes of the switch E are moved to normal at this time over a circuit from battery through magnet 303, conductor 356, right front contact of relay 101, conductor 121, outermost right back contact of relay 506, conductor 532, upper contact of key 507, conductor 533, normal contacts of stepping magnets 302 and 303, conductor 326, conductor 327, right front contact of relay 102, conductor 158, terminal 21 and brush of arc 109, conductor 152, conductor 159, outermost left front contact of relay 101 to ground on the left front contact of relay 103. When terminal 21 of the switch E is passed, relay 102 is released. Relay 101 was held operated in parallel with relay 102 in order to step the switch E to normal. When relay 102 releases, relay 101 also releases closing a circuit for stepping magnet 302 of switch D from battery through magnet 302, conductor 325, right back contact of relay 101, conductor 121, outermost right back contact of relay 506, upper normal contact of key 507, conductor 533, through the normal contacts of magnets 302 and 303, conductor 326, conductor 327, right back contact of relay 102, outermost right front contact of relay 103, conductor 155, terminal 21 and brush of arc 112, conductor 123 to ground on the left front contact of relay 103. Relay 103 releases when terminal 21 of arc 112 of the switch D is passed. The circuit is now in condition for testing the B group of drums.

When drum S—40 of the A group is tested, sequence switch 210 moves to position 11 over the checking path. In position 11 of sequence switch 210, sequence switch 220 is restored to normal position 10 over a circuit from battery through sequence switch magnet 220, lower right contact of sequence switch spring 208, conductor 294 to ground on the upper left contact of sequence switch spring 213. Sequence switch 210 now moves to position 12 over a circuit hereinbefore traced to ground on sequence switch spring 212. In position 12 of sequence switch 210, sequence switch 410 is moved off normal over a circuit from battery through sequence switch magnet 410, lower right contact of sequence switch spring 411, conductor 491, upper contacts of sequence switch spring 402, conductor 405 to ground through the lower left contact of sequence switch spring 212. Sequence switch 210 now moves out of position 12 over a circuit from battery through magnet 210, lower right contact of sequence switch spring 211, conductor 427, to ground through the upper right contact of sequence switch spring 412. As position 13 of sequence switch 210 is a pass by position, the switch is moved by ground on the master contact of the sequence switch magnet to position 14. The switch is moved out of position 14 over a circuit from battery through the winding of sequence switch magnet 210, upper contacts of sequence switch spring 201, conductor 446 to ground through the upper left contact of sequence switch spring 412. Sequence switch 210 is advanced through positions 15, 16, 17 and 18 by ground on the master contact of the sequence switch. With sequence switch 410 advanced to position 2 a circuit is established for the transfer relay 304 from battery through this relay, conductor 357, to ground at the upper left contact of sequence switch spring 403. The operation of relay 304 substitutes relay 323 for relay 105 for connecting the receiving drums of the B group rather than the receiving drums of the A group to the register relays, and transfers control conductors 328 and 329 to springs of sequence switch 410 rather than to springs of switch 220. When sequence switch 210 reaches position 1, a circuit is then completed for testing drums S'—0 of the B group. Brushes 450 to 490, inclusive, are connected through springs of sequence switch 410 to the test circuit and the register relays of the test circuit to the brushes 440 to 445, inclusive, which engage the drums of section R' of the pulse machine. Brushes 450 to 490, inclusive, engage the drums S' of drum B.

The test of the B group of drums proceeds exactly as described for the A group of drums with the exception that relay 323 is used in place of relay 105 until sequence switch 410 reaches position 9 and sequence switch 210 reaches position 11, at which time magnet 517 is energized in a circuit from battery through the magnet, terminal 1 and brush of arc 521, conductor 559, inner left front contact of relay 504, conductor 560, upper contacts of sequence switch spring 413, conductor 492, lower left contact of sequence switch spring 412 to ground. When sequence switch 210 advances past position 15, magnet 517 deenergizes and steps switch C one terminal to register a complete test of the A and B groups of drums.

*Second test of "A" group of drums.*—Sequence switch 210 moves out of position 11 in a circuit from battery through sequence switch magnet 210, upper right contact of sequence switch spring 211 to ground at the upper contact of sequence switch spring 212. It moves from position 12 into position 13 over a circuit from battery, sequence switch magnet 210, lower right contact of sequence switch spring 211, conductor 427, to ground through the upper right contact of sequence switch spring 412. It moves to position 14 under control of ground on its master contact. In positions 14 of sequence switch 210, sequence switch 410 is restored to normal in a circuit from battery through sequence switch magnet 410, contacts of sequence switch spring 401, conductor 298, lower right contact of sequence switch spring 213 to ground. Sequence switch 210 moves out of position 14 in a circuit from battery through its magnet, upper contacts of sequence switch spring 201, conductor 446, to ground through upper left contact of sequence switch spring 412. Sequence switch 210 advances through positions 15, 16, 17 and 18 under control of its master contact. Relay 304 is now released transferring control back to relay 105 and sequence switch 220 for associating the receiving and sending drums of the A group with the testing device.

With switch C in position 2 a circuit is established for relay 104 from battery through the winding of this relay, conductor 145 the No. 2 terminal and brush of arc 523, inner right front contact of relay 504 conductor 532 to ground at the inner right front contact of start relay 301. Relay 305 is also energized at this time over a circuit extending from battery through its winding, No. 2 terminal and brush of arc 522 of switch C to ground at the outer right front contact of relay 504. With relays 104 and 305 energized, conductors 138 to 143 inclusive, are transferred through contacts of either relay 105 or 323 to the windings of register relays 118, 119, 120, 318, 319 and 320, from the windings of register relays 106, 107, 108, 306, 307 and 308. When relay 305 operates relay 518 is substituted for relay 513 so that during the second test of the pulse machine drums relay 518 operates in a circuit extending from the A group of sending drums of the pulse machine over conductor 246, the outer right back contact of relay 304, conductor 329, the innermost upper front contact of relay 305, conductor 251, winding of relay 518 thence as previously traced for operating relay 513. The register relays 118, 119, 120, 318, 319 and 320, relay 518 and relay 105 operate to control relays 115, 116, 117, 315, 316 and 317 in the manner previously described for the control of these relays.

It is to be noted in this connection that as switch C advances one step after each complete test of all of the drums of the pulse machine, it alternately renders the relays 513 and 518 and the two sets of register relays available for the purpose of applying different test conditions one set of register relays having a stiff adjustment to fail on weak pulses and the other set having a weak adjustment to operate on false pulses of any sort. This change is made alternately until the switch C reaches position 21. In position 21 switch C is advanced automatically over the brush of arc 520 into position 22. In position 22, relay 502 is operated from battery through its winding, terminal 22 and brush of arc 522 to ground on the outer left front contact of relay 504. The operation of relay 502 opens the locking path for start relay 301, allowing relay 301 to release. The release of relay 504 allows magnet 517 to restore the switch C to normal.

If at any time during the test of either the A or B groups of drums a condition arises whereby two adjacent brushes or drums are short circuited, an incorrect number of register relays will be operated causing the circuit to stop and light the signal lamp 525 and operate the gong 527. For example, if brushes 274 and 275 should be bent together or short circuited while the sequence switch 220 is in position 2 (which is the position for testing drum S—0) five impulses will be sent out instead of one thereby operating an incorrect number of the register relays and relay 506 will remain unoperated thus operating relay 526 which in turn lights the lamp 525 and operates relay 505 ringing the gong 527 as a signal of an unstandard condition.

*Failure of drums.*—If at any time during any of the tests of the drums of groups A or B incorrect registration is made, relay 506 will not operate and relay 526 is operated from battery through resistance 556 to its winding, outermost left front contact of relay 506, outermost left front contact of relay 546, conductors 536 and 537, outermost left front contact of relay 514, right back contact of relay 508, conductor 538, and to ground through springs 206, 207, 209 and 423 depending upon what drum of the A or B group is under test and the consequent positions of sequence switches 210, 220 and 410. The operation of relay 526 closes a circuit from ground on its make contact through lamp 525 and winding of relay 505 to battery. This circuit operates relay 505 and lights lamp 525. In turn, a circuit is closed on the front contact of relay 505 for ringing gong 527, thus giving an audible and visible signal to the test man or operator that the test circuit has been blocked on account of a failure, short or open circuit. Should the timing leads 226 or 349 from the A or B groups of the pulse machine be open and therefore pick up relays 511 and 512 fail to operate, relay 526 will operate in a circuit from battery through its winding, innermost left front contact of relay 514, conductor 554, back contact of relay 511, conductor 536, conductor 537, outermost left front contact of relay 514, right back contact of relay 508, conductor 538 to ground at springs of sequence switches 210, 220 and 410. The operation of relay 526 operates the alarm and lights the lamp as hereinbefore described. In order that the test man or operator may be able to determine the number of the drum and group upon which the failure has occurred, progress lamps are provided, progress lamps 0 to 3 being used for designating the tens digit of the number and lamps 0' to 9' being used to designate the units digit of the number. There are also provided lamps A and B for designating the group of drums upon which the failure has occurred, lamp A designating the A group and lamp B designating the B group.

*Repeat tests.*—The test on any individual drum may be repeated by operating key 507 at the time when the circuit has progressed to the drum or after a failure. After relay 506 is operated to indicate correct registration instead of advancing the test circuit for testing the next drum as previously described, with key 507 operated relay 508 is operated from battery, through its right winding, uppermost alternate contact of key 507, conductor 532, outermost front contact of relay 506, conductor 538 to ground through springs of sequence switches 210, 220 or 410. Relay 508 locks to ground from battery, on its left front contact through its left winding, right back contact of relay 524, lower alternate contact of key 507, conductor 538 to ground through springs of sequence switches 210, 220 or 410. The operation of relay 508 unlocks all of the counting relays 541 to 546 and 561 to 566 and any one or more of relays 106, 107, 108, 118, 119, 120, 306, 307, 308, 318, 319 or 320 which were operated on the preceding test, in turn releasing relays 115, 116, 117, 315, 316 and 317 and relay 506. With key 507 operated when relay 506 operates, the circuit for relays 321 and 322, hereinbefore traced is not effective and therefore switches D, E and sequence switches 210, 220 and 410 do not advance to select another drum for test. When 506 releases, relay 524 operates in a circuit from battery at the left front contact of relay 508, through its winding, intermediate alternate contact of key 507, conductor 561 to ground at the innermost right back contact of relay 506. The operation of relay 524 releases relay 508. The release of relay 508 releases relay 524. The test is then repeated in a similar manner as hereinbefore described as long as key 507 is held operated.

*Restoring a circuit to normal after failure.*—When it is desired to restore the test circuit to normal, key 503 is operated. In this case, it is assumed that the failure has occurred on drum S—10 of the A group of drums. At this time, sequence switch 210 is in position 1. Sequence switch 220 is in position 4 and sequence switch 410 is normal. The switch D is in position 12 and the switch E is in normal position. When key 503 is operated the circuit of relay 514 and the holding circuit of relay 301 are opened. Relay 514 upon releasing unlocks any operated counting relays, the release of relay 546 opening the circuit of relay 506. With switch D assumed to be in position 12 a circuit is closed for stepping magnet 302 extending from battery, winding of relay 302, conductor 325, right back contact of relay 101, conductor 121, outer right back contact of relay 506, conductor 532, upper normal contact of key 507, conductor 533, normal contacts of magnets 302 and 303, conductor 326, right back contact of relay 102, outer right back contact of relay 103, conductor 122, innermost lower alternate contact of key 503, conductor 535, terminal 12 and brush of arc 112, conductors 123 and 571 to ground at the upper alternate contact of key 503. Magnet 302 operates, opening its own circuit and advances the brushes of switch D to position 13. In position 13 a similar circuit is closed for magnet 302 extending in this case from conductor 122 through the outermost lower alternate contact of key 503, conductor 570, terminal 13 and brush of arc 112 over conductor 571 to ground. Magnet 302 now advances switch D to position 14 and thence to normal over the two alternative circuits above traced.

The operation of key 503 upon opening the circuit for relay 301 causes it to release and connect ground over conductors 339, 341 and 254 for restoring any of the sequence switches 210, 220 or 410 which at the time are off normal to normal. The circuit for restoring sequence switch 220 extends from conductor 254 through the upper right contact of spring 208, through the winding of magnet 220 to battery. Relay 301 also opens the locking circuit of relay 504 which upon releasing closes a circuit from ground at its outer left back contact, conductor 551, terminals and brush of arc 520 of switch C, normal contact and winding of magnet 517 to battery. Magnet 517 energizing in this circuit restores switch C to normal.

When the switches C and D have been restored and the sequence switches are in their normal positions all operated relays are released and the testing circuit is completely restored.

What is claimed is:

1. In a testing system for testing impulse producing apparatus, a testing device, a signal, and means for associating said testing device with said impulse producing apparatus, said testing device including means operative only if the impulses transmitted by said impulse producing apparatus are of an improper current strength, to actuate said signal.

2. In a testing system for testing an impulse producing apparatus comprising a plurality of commutators, each commutator having one or more metallic segments and a plurality of brushes one for each commutator for completing circuits through said commutators, a test device, and means in said test device to automatically and successively connect said commutators with said test device.

3. In a testing system for testing an impulse producing apparatus comprising a plurality of commutators, each having one or more metallic segments and a plurality of brushes, one for each commutator for completing circuits through said commutators, a testing device, and means to operate said testing device to automatically connect said commutators with said testing device in fixed sequence.

4. In a testing system for testing an impulse producing device comprising a plurality of commutators and a plurality of brushes, a testing device, a signal, and means for associating said testing device with said impulse producing device, said testing device including means operative, if the impulses transmitted by said impulse producing device are of an improper character, to actuate said signal.

5. In a testing system for testing an impulse producing apparatus comprising a plurality of commutators, each commutator having one or more metallic segments and a brush individual thereto, a testing device, a signal, means for associating said testing device with said impulse producing apparatus, said testing device including means for repeatedly testing the character of the impulses, and means for actuating said signal if the impulses transmitted by said apparatus are of an improper character.

6. In a system for testing a series of similar electrical devices, signals individual to said devices, testing means for said devices, means for progressively associating said devices with said testing means, and means for automatically stopping the test when an unstandard device is tested and for automatically displaying the signal corresponding thereto.

7. In a testing system for testing an impulse producing apparatus comprising a plurality of commutators each having one or more metallic segments and a plurality of brushes one for each commutator for completing circuits through said commutators, a testing device, means for successively connecting said commutators with said testing device, and means for preventing the successive connection of said commutators with said testing device and for causing the repeated connection of any given commutator to said testing device.

8. In a testing system for testing an impulse machine having a plurality of rotatable commutators and a brush associated with each commutator, means to test said machine for continuity of circuit between said brushes and said commutators under conditions similar to those which would be encountered in actual practice, and means to automatically continue said testing operations a predetermined number of times.

9. In a testing system for testing an impulse machine having a plurality of rotatable commutators and a brush associated with each commutator, means to test said machine for continuity of circuit between said brushes and said commutators under conditions similar to those which would be encountered in actual practice, means to automatically continue said testing operation a predetermined number of times, a signal, and means to actuate said signal if an unstandard condition exists at the contacts of any brush and associated commutator.

10. In a testing system for testing an impulse machine having a plurality of rotatable commutators and a brush associated with each commutator, means to test said machine for continuity of circuit between said brushes and said commutators under the condition of a short circuit between brushes or commutator segments, a signal, and means to actuate said signal if said condition exists between said brushes.

11. In a testing system for testing an impulse machine having a plurality of rotatable commutators and a brush associated with each commutator, means to successively test said commutators for continuity of circuit between said commutators and said brushes under conditions similar to those which would be found in actual practice, means to automatically continue said testing operation a predetermined number of times, and means to repeat the test on any one of the commutators of said machine during the test.

12. In a testing system for testing an impulse machine comprising a plurality of groups of commutators each commutator being provided with one or more metallic segments and a brush for each of said commutators, a testing device, means operating automatically to alternately associate the groups of commutators with the testing device, and means for successively connecting the commutators of the associated group with the testing device.

13. In a testing system for testing an impulse machine comprising a plurality of groups of commutators each commutator being provided with one or more metallic segments, and a brush for each commutator for engaging said metallic segments, a testing device, means operating automatically to alternately associate the groups of commutators with the testing device, means to successively connect the commutators of the associated group with the testing apparatus, and signals for indicating which group of commutators and which commutator of the particular group is being tested.

14. In a testing system for testing an impulse machine comprising a plurality of groups and sub-groups of commutators each commutator being provided with one or more metallic segments and a brush for each commutator for engaging said metallic segments, a testing device, means operating automatically to alternately associate the groups and sub-groups of commutators with the testing device, means to successively connect the commutators of the associated group with the testing apparatus and signals for indicating which group of commutators and which commutator of the particular group and sub-group is being tested.

15. In a testing system for testing impulse producing apparatus, a testing device, a signal, and means for associating said testing device with said impulse producing device, said testing device including means operative, if the impulses transmitted by said impulse producing device are of an improper character, to actuate said signal and to stop the test.

16. In a testing system for testing an impulse machine having a plurality of rotatable commutators and a brush associated with each of said commutators, a relay, means for establishing a circuit through said relay and said commutators in succession, said relay being unresponsive when connected into circuit with a commutator which effects an open or high resistance contact with its brush, and a signal for indicating the unoperated condition of said relay.

17. In a testing system for testing an impulse machine having a plurality of rotatable commutators and a brush associated with each of said commutators, a relay, means for establishing a circuit through said relay and certain of said commutators in succession, said relay being unresponsive when connected in circuit with a commutator which effects an open or high resistance contact with its brush, a group of relays adapted to be variably operated over circuits controlled by said first relay and other of said commutators, the relays of said group being unresponsive when the commutators connected into circuit therewith effect open or high resistance contact with their brushes respectively, and a signal under the control of said group of relays for indicating an unstandard condition at any of said commutators.

18. In a testing system for testing an impulse machine having a plurality of rotatable commutators and a brush associated with each of said commutators, a pair of relays, means for establishing a circuit through either of said relays and certain of said commutators in succession, said relays being differently responsive to an unstandard condition at said commutators and brushes, two groups of relays adapted to be variably operated over circuits controlled by said first relays and other of said commutators, the relays of said groups being differently responsive to an unstandard condition at said other commutators and brushes, a switch adapted to alternately select one of said first relays and one of said two groups of relays and a signal under control of said two groups of relays for indicating an unstandard condition of any of said commutators.

19. In a testing system for testing an impulse machine having a plurality of rotatable commutators and a brush associated with each of said commutators, a relay, means for establishing a circuit through said relay and certain of said commutators in succession, said relay being responsive when connected in circuit with a commutator which transmits a false impulse, a group of relays adapted to be variably operated over circuits controlled by said first relay and other of said commutators, the relays of said group being responsive when the commutator connected into circuit therewith transmits a false impulse and a signal under the control of said group of relays for indicating an unstandard condition at any of said commutators.

20. In a testing system for testing an impulse machine comprising a plurality of rotatable commutators and a brush associated with each of said commutators, a plurality of relays, means for establishing circuits through a pair of said commutators and a pair of said relays simultaneously, said relays being unresponsive when connected into circuit with a commutator which effects an open circuit or high resistance contact with its associated brush, and a signal for indicating the unoperated condition of either of said relays.

In witness whereof, I hereunto subscribe my name this 15th day of November A. D., 1924.

HARRY W. MacDOUGALL.